US005758135A

United States Patent [19]

Tucker et al.

[11] Patent Number: 5,758,135

[45] Date of Patent: May 26, 1998

[54] SYSTEM AND METHOD FOR FAST CLOCKING A DIGITAL DISPLAY IN A MULTIPLE CONCURRENT DISPLAY SYSTEM

[75] Inventors: David M. Tucker; William Low, both of Vancouver, Canada

[73] Assignee: Seiko Epson Corporation, Tokyo, Japan

[21] Appl. No.: 721,087

[22] Filed: Sep. 24, 1996

[51] Int. Cl.[6] .................. G06F 1/10; G09G 5/00

[52] U.S. Cl. .................. 395/556; 345/3

[58] Field of Search .................. 395/555, 556; 345/3

[56] References Cited

U.S. PATENT DOCUMENTS

| | | | |
|---|---|---|---|
| 4,275,421 | 6/1981 | Louie et al. | 348/589 |
| 4,860,246 | 8/1989 | Inoue | 345/520 |
| 4,926,166 | 5/1990 | Fujisawa et al. | 340/717 |
| 5,218,274 | 6/1993 | Zenda | 315/366 |
| 5,222,212 | 6/1993 | Johary et al. | 345/3 X |
| 5,309,168 | 5/1994 | Itoh et al. | 345/3 |
| 5,406,308 | 4/1995 | Shiki | 345/127 |
| 5,448,260 | 9/1995 | Zenda et al. | 345/100 |
| 5,475,402 | 12/1995 | Hijikata | 345/3 X |
| 5,488,385 | 1/1996 | Singhal et al. | 345/3 |
| 5,534,883 | 7/1996 | Koh | 345/3 |
| 5,579,025 | 11/1996 | Itoh | 345/3 |

*Primary Examiner*—Thomas M. Heckler
*Attorney, Agent, or Firm*—Michael T. Gabrik

[57] ABSTRACT

A clocking system including a line clock system for generating normal line clock pulses to the digital display during the period when the image is being rendered and for generating fast line clock pulses to the digital display during the vertical blanking period to address the otherwise unaddressed vertical region. The clocking system further includes a pixel clock system for generating normal pixel clock pulses to the digital display during the period when the image is being rendered and for generating fast pixel clock pulses to the digital display during the horizontal and vertical blanking periods to address the otherwise unaddressed horizontal and vertical regions.

20 Claims, 8 Drawing Sheets

SYSTEM AND METHOD FOR FAST CLOCKING A DIGITAL DISPLAY IN A MULTIPLE CONCURRENT DISPLAY SYSTEM

BACKGROUND OF THE INVENTION

1. Field of the Invention

This invention relates generally to graphics display controllers, and more particularly to a system and method for fast clocking a digital display in a multiple concurrent display system.

2. Description of the Background Art

Certain conventional graphic controllers can control the simultaneous display of a single image on two different monitors. For example, an image may be displayed on a Liquid Crystal Display (LCD) at the same time it is displayed on a Cathode Ray Tube (CRT) or Television (TV). FIG. 1 is a block diagram illustrating a prior art multiple display system 100 for displaying images concurrently on an LCD 105 and on a CRT or TV 110. A Central Processing Unit (CPU) 125 based on a computer, such as a Power Macintosh manufactured by Apple Computer, Inc. of Cupertino, Calif. or such as an IBM® PC manufactured by the IBM Corporation of Armonk, N.Y., for controlling image processing and other system 100 functions is coupled via a bus 130 to a typical graphics controller 115. Graphics controller 115 is coupled via a bus 135 to video memory 120 for storing and retrieving image data, via a bus 140 to CRT or TV 110, and via a bus 145 to LCD 105. Graphics controller 115 sends data signals, line clock signals, frame signals and pixel clock signals on bus 140 and on bus 145 to operate CRT or TV 110 and LCD 105, respectively. Because of a limited bandwidth to video memory 120, graphics controller 115 transfers the same image information from video memory 120 to LCD 105 and to CRT or TV 110 synchronously.

Significant problems arise when LCD 105 has a different resolution than CRT or TV 110. TVs adhering to the National Television Standards Committee (NTSC) standard have an image size of 754 picture elements (pixels) by 486 lines and have a scan size of 910 pixels by 525 lines. LCDs may have a larger scan size of for example approximately 1024 pixels by 768 lines. TVs also have very strict timing requirements to which the LCD timings must adhere. Since the typical LCD 105 scan size is larger than the TV scan size, not all of the entire LCD is addressed, i.e., there are 1024−910=114 unaddressed pixels and 768−525=243 unaddressed lines.

To run software which implements a typical 640-pixel-by-480-line image space, a CRT 110 having a scan size of 800 pixels by 525 lines is preferred. Accordingly, using an LCD and the CRT concurrently leaves unaddressed regions on the LCD as when using an LCD and a TV concurrently. Although some current multi-frequency CRTs have variable scan rates from which system designers may select to attempt satisfying timing requirements for both LCD 105 and CRT 110, there are drawbacks to this solution. For example, when using scan rates for images which are finer than the display resolution, the images appear small and do not fill up the entire display. For shrunken images to be stretched horizontally and vertically, some system designers use inter-pixel duplication or inter-pixel interpolation which undesirably alters aspect ratios.

FIG. 2 illustrates details of a prior art single panel passive or active matrix LCD 105 having the dimensions of 1024 pixels by 768 lines when receiving image information based on the scan rates of TV 110. LCD 105 includes a horizontal shift register 205, 1024 selectable latches 210, a 1×1024 integral latch 215, 1024 pixel drivers 220, a vertical shift register 225, 768 line drivers 230 and a display 235. Those skilled in the art will appreciate that the display 235 regions based on the scan rates for a CRT 110 are similar to the display regions 235 based on the scan rates for a TV 110.

Horizontal shift register 205 receives a pixel clock signal at an input terminal $SHIFT_H$ and a line clock signal at an input terminal $IN_H$. Based on the pixel clock signal, horizontal shift register 205 enables a corresponding selectable latch 210 to store incoming pixel data signals. For example, horizontal shift register 205 receives a first pixel clock signal and accordingly enables the first selectable latch 210 to store the first pixel data signal being retrieved from display memory 120 (FIG. 1). Upon receipt of the next pixel clock signal, horizontal shift register 205 disables modification of the value captured in first selectable latch 210 and enables the second selectable latch 210 to capture the next incoming pixel data signal. Each selectable latch 210 is synchronized with the pixel clock signal. This process continues until selectable latches 210 have captured a line of pixel information. Upon receipt of a line clock signal, integral latch 215 stores the line of pixel data from selectable latches 210, horizontal shift register 205 re-enables selectable latches 210 to capture a new line of pixel data, and the process is repeated for the next line of image pixel data.

Integral latch 215 passes the captured line of pixel data in parallel through pixel drivers 220 to form a line on display 235. Based on the line clock signal, vertical shift register 225 determines which line of display 235 receives the line of pixel data. Upon receipt of a frame signal at an input terminal $IN_V$, vertical shift register 235 uses the first line driver 230 to enable the first line of display 235 to capture the next line of pixel data. Vertical shift register 225 uses the first one of line drivers 230 to enable the first line of display 235 to receive the line of pixel data. With each successive line clock signal, vertical shift register 225 disables the previous line and uses a successive line driver 230 to enable a successive line of display 235 to receive the next line of pixel data. If display 235 uses interlacing, vertical shift register 235 shifts by two lines. While the pixel information for a given line is being displayed, horizontal shift register 205 and integral latch 215 retrieve and capture the pixel information for the next line. The process is repeated for each frame of image information.

FIG. 3 illustrates a timing diagram for rendering an image frame on a conventional 1024-pixel-by-768-line LCD. Graphics controller 115 (FIG. 1) generates a frame signal indicating the start of an image frame and then generates a line clock signal as a series of 768 line clock pulses indicating the receipt of respective lines of pixel data in the image frame. After each line clock pulse, graphics controller 115 generates a pixel clock signal as a series of 1024 pixel pulses indicating the synchronized receipt of pixel data for respective pixels in that line. After receiving the 768th line clock pulse, vertical shift register 225 clocks on a new frame pulse and repeats the process for the next frame.

If graphics controller 115 (FIG. 1) applies the scan size and timing requirements for a TV 110 to an LCD 105, then display 235 (FIG. 2) renders an image 240, a horizontal blank region 247 and a vertical blank region 245 and includes a horizontal unaddressed region 250 and a vertical unaddressed region 255. FIG. 4 is a timing diagram illustrating the generation of blank regions 245 and 247 and unaddressed regions 250 and 255. Graphics controller 115 generates a frame signal and then generates a line clock signal as a series of only 525 pulses representing the vertical scan size. Since a TV 110 has an image size of 486 lines, only 486 of the 525 scan lines include data. The remaining 39 scan line s represent vertical blank region 245, and the time period needed for rendering vertical blank region 245 is termed the "vertical blanking period." Further, since each frame on LCD 105 includes 768 scan lines, only 525 lines out of the 768 LCD scan lines are ad dressed. The remaining 243 lines represent vertical unaddressed region 255.

After each line pulse, graphics controller 115 generates a pixel clock as a series of 910 pulses representing the horizontal scan size. Since a TV 110 has an image size of 754 pixels, the remaining 156 pixels represent horizontal blank region 247, and the time period needed to render each line in horizontal blank region 247 is termed the "horizontal blanking period." Further, since each line on LCD 105 includes 1024 pixels, only 910 out of the 1024 pixels are addressed. The remaining 114 pixels represent horizontal unaddressed region 250.

A significant problem resulting from using horizontal shift register 205 and vertical shift register 225 in a system supporting unaddressed regions is image echoing. Shift registers 205 and 225 echo duplicate image portions to unaddressed regions 250 and 255, respectively. That is, upon receipt of a line clock pulse, conventional horizontal shift register 205 re-enables the first of selectable latches 210 to capture new pixel data without disabling the currently enabled selectable latch 210. Similarly, upon receipt of a frame signal, vertical shift register 205 re-enables the first line of display 235 to display a new line of pixel data without disabling the currently enabled line. Thus, in the example of FIG. 2, the first 114 pixels are echoed in unaddressed pixel positions 911 to 1024, and the first 243 lines of pixel data are echoed in unaddressed lines 526 to 768.

Therefore, a system and method are needed for controlling a digital display such as an LCD during the horizontal and vertical blanking periods to generate image information for the unaddressed portions of the digital display.

SUMMARY OF THE INVENTION

The present invention overcomes the limitations and deficiencies of previous systems by providing a system and method for fast clocking a digital display such as a liquid crystal display (LCD), to address potentially unaddressed horizontal and vertical regions when using raster-scan timing requirements for a display having a smaller scan size such as a CRT or a TV. The clocking system includes a line clock system for generating normal line clock pulses to the digital display during the period when the image is being rendered and for generating fast line clock pulses to the digital display during the vertical blanking period to address the otherwise unaddressed vertical region. The clocking system further includes a pixel clock system for generating normal pixel clock pulses to the digital display during the period when the image is being rendered and for generating fast pixel clock pulses to the digital display during the horizontal and vertical blanking periods to address the otherwise unaddressed horizontal and vertical regions.

The clocking system uses a multiplexer having a first input terminal connected to receive normal line clock pulses from a normal line clock, a second input terminal connected to receive fast line clock pulses from a fast line clock, an output terminal connected to the digital display, and a control terminal which enables the normal line the normal line clock pulses to pass to the output terminal during the image rendering period and enables the fast line clock pulses to pass to the output terminal during the vertical blanking period.

Further, the clocking system uses a multiplexer having a first input terminal connected to receive normal pixel clock pulses from a conventional pixel clock, a second input terminal connected to receive fast pixel clock pulses from a fast pixel clock, an output terminal connected to the digital display, and a control terminal at which application of a select signal enables the normal pixel clock pulses to pass to the output terminal during the image rendering period and enables the fast pixel clock pulses to pass to the output terminal during the horizontal and vertical blanking periods.

For a digital display having N pixels by M lines and a different display having A pixels by B lines with an image size of C pixels by D lines, the speeds of the fast line clock and of the fast pixel clock for handing only a single pixel per pixel clock pulse are computed according to the equations $$(N-C)*\quad T_{HF} \leqq (A-C)*T_{HC};$$
$$T_{VF} \geqq N*T_{HF}; \text{ and}$$
$$(M-D)*\quad T_{VF} \leqq (B-D)*T_{VC}$$

where $T_{HF}$ is the period of a fast pixel clock, $T_{HC}$ is the period of a normal pixel clock, $T_{VF}$ is the period of a fast line clock and $T_{VC}$ is the period of a normal line clock.

DETAILED DESCRIPTION OF THE PREFERRED EMBODIMENT

Figure 1:
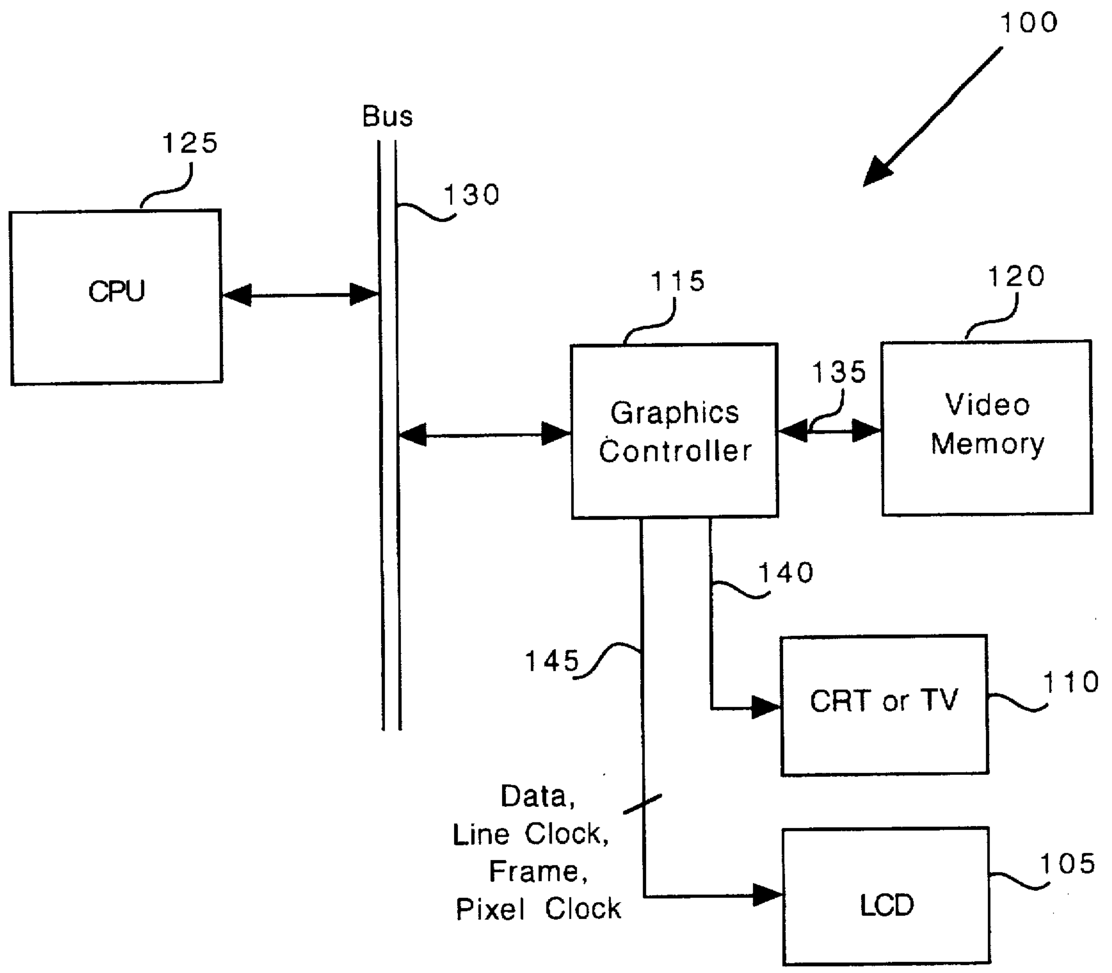
FIG. 1 (Prior Art)
FIG. 1 is a block diagram illustrating a typical multiple concurrent computer graphics display system.

The present invention improves upon the conventional concurrent multiple display system 100 described above with reference to FIG. 1 by facilitating the concurrent use of multiple displays. The multiple displays include a digital display such as a Liquid Crystal Display (LCD) 105, and a display, such as a Cathode Ray Tube (CRT) or a Television (TV) 110, having a raster-scan size smaller than the digital display raster-scan size.

Figure 5A:
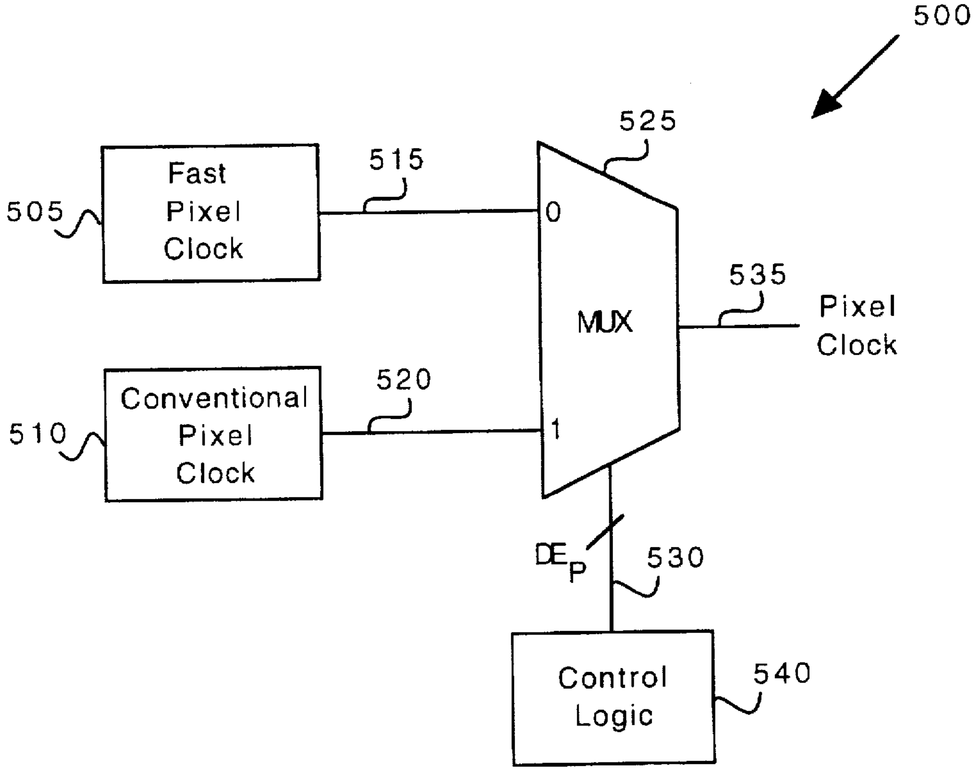
FIG. 5A is a block diagram illustrating a pixel clock system of a computer graphics controller in accordance with the present invention.

FIG. 5A is a block diagram illustrating a pixel clock system 500 which, in accordance with the present invention, replaces the conventional clock system in otherwise conventional computer graphics controller 115. Pixel clock system 500 includes a multiplexer (MUX) 525 which receives a fast pixel clock signal on line 515 from a fast pixel clock 505, a normal pixel clock signal on line 520 from a conventional pixel clock 510 and a control signal $DE_p$ on line 530 from control logic 540. Based on the control signal $DE_p$, MUX 525 passes either the fast pixel clock signal or the normal pixel clock signal as the pixel clock output signal on line 535.

Figure 2:
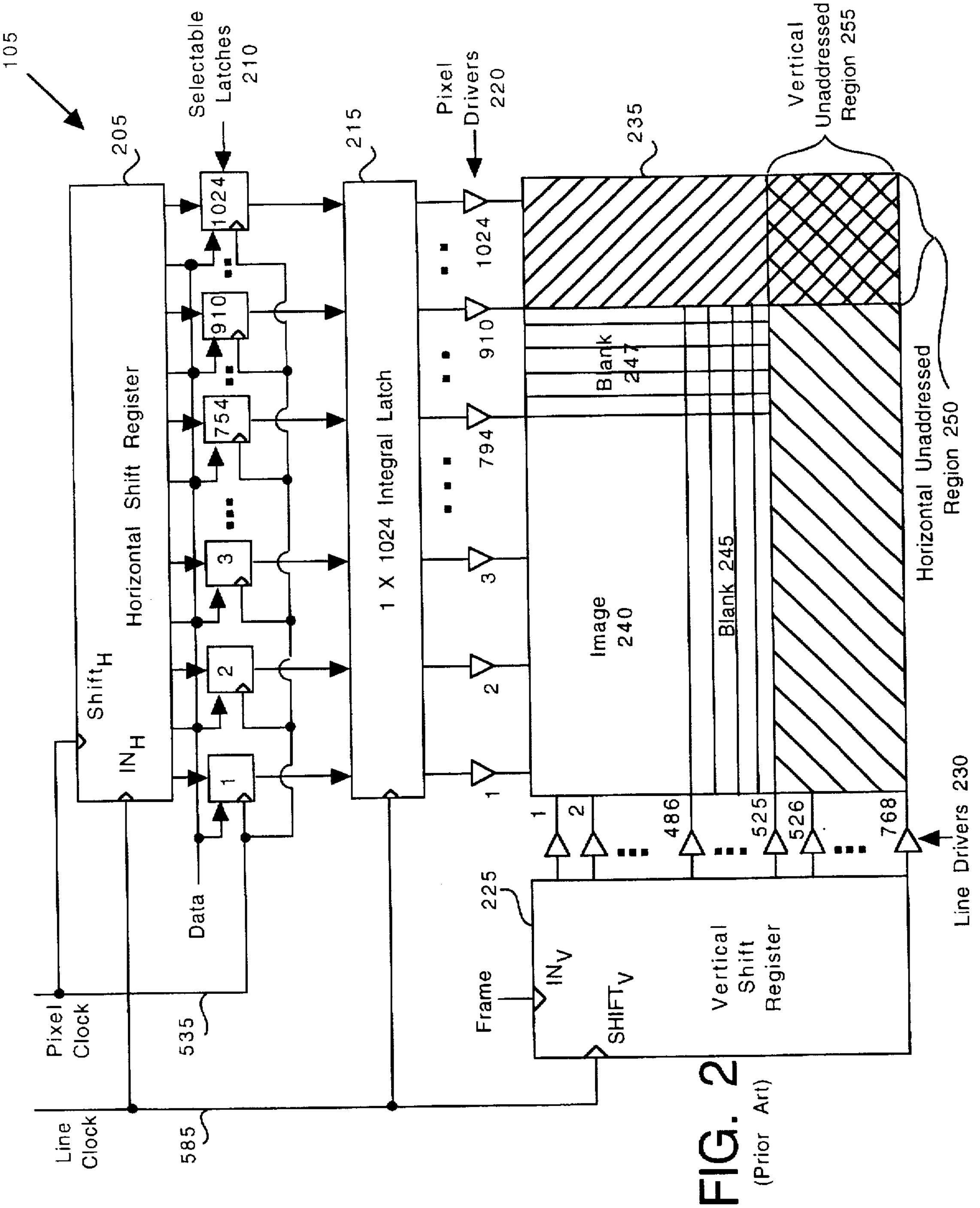
FIG. 2 (Prior Art)
FIG. 2 is a block diagram illustrating the LCD of FIG. 1.
Figure 3:
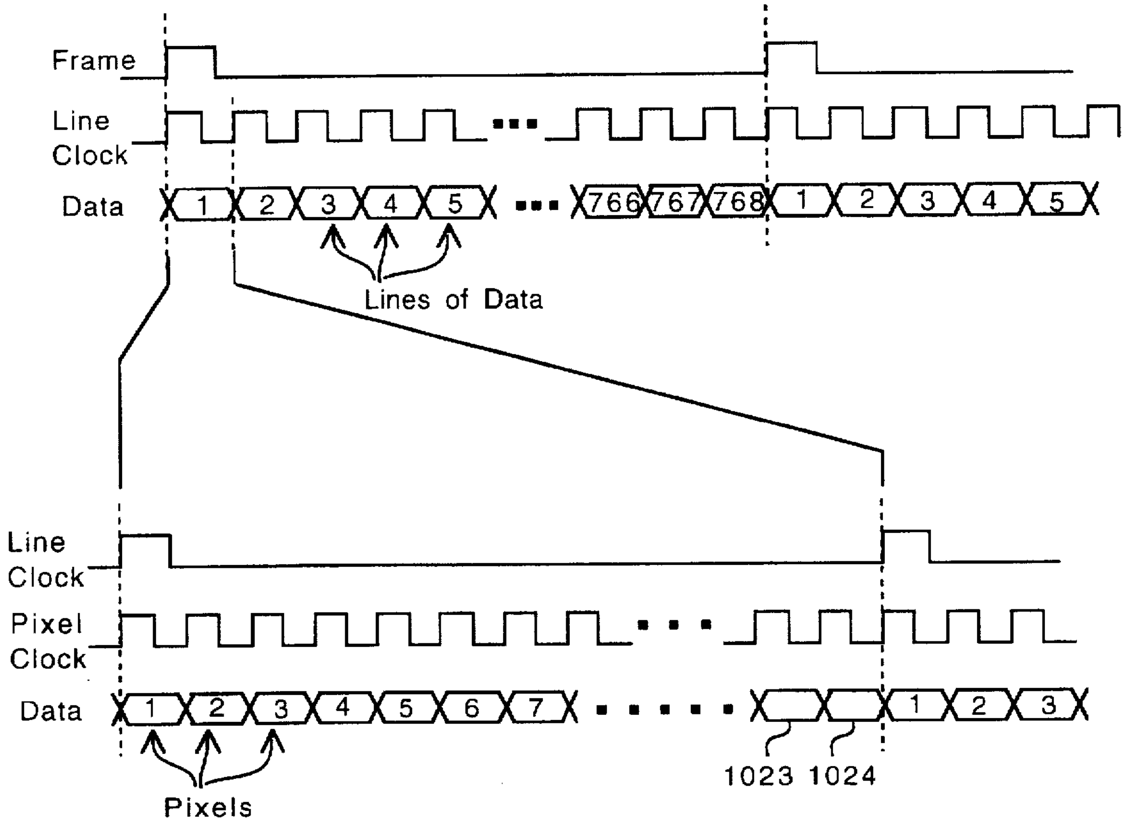
FIG. 3 (Prior Art)
FIG. 3 is an LCD timing diagram illustrating the rendering of a conventional 1024 pixels by 768 lines LCD image frame.
Figure 4:
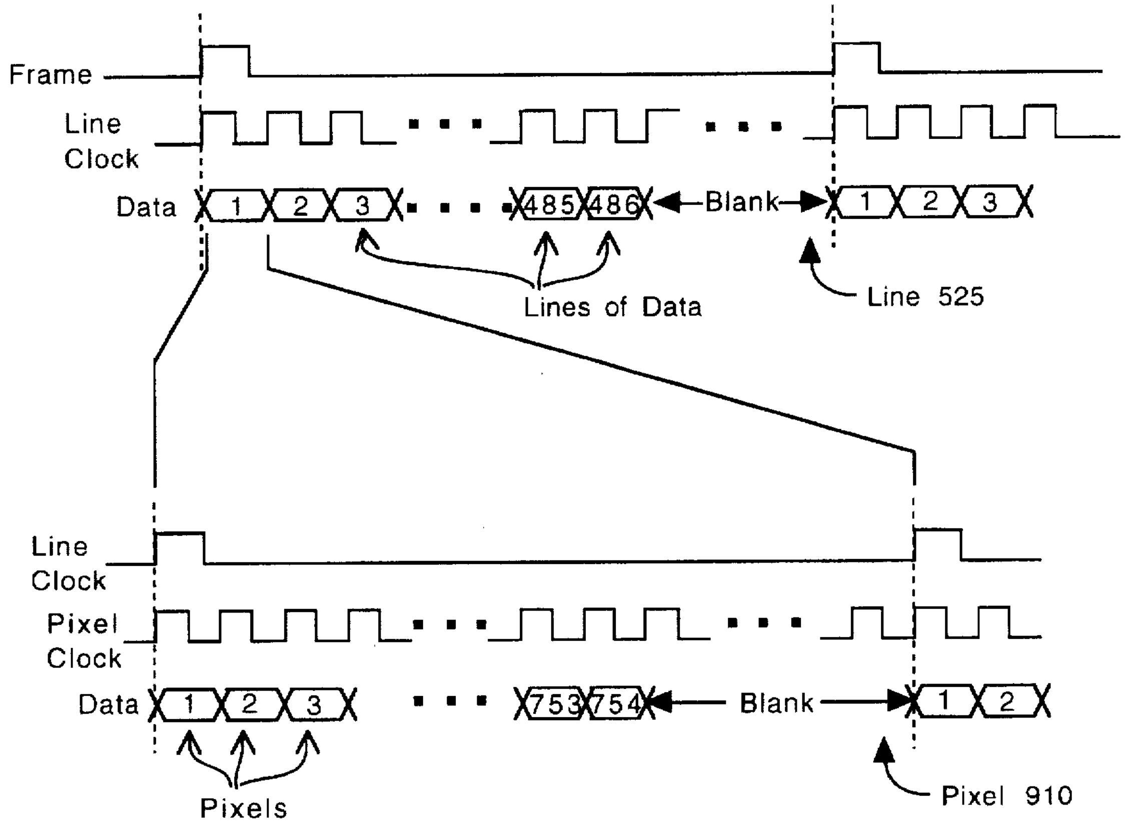
FIG. 4 (Prior Art)
FIG. 4 is a timing diagram illustrating the generation of blank regions and unaddressed regions on the FIG. 2 display.

During the rasterization of the image region 240 on display 235 (FIG. 2), control logic 540 instructs MUX 525 to pass the normal pixel clock signal from the conventional pixel clock 510 as the pixel clock output signal on line 535. However, during the horizontal blanking period, control logic 540 instructs MUX 525 to pass the fast pixel clock signal from the fast pixel clock 505 as the pixel clock output signal on line 535. The pixel clock output signal of pixel clock system 500 replaces the conventional pixel clock signal applied to horizontal shift register 205 and to selectable latches 210.

The fast pixel clock signal clocks the remaining selectable latches 210 corresponding to the horizontal unaddressed region 250 until each remaining selectable latch 210 has captured the "blank" data value (e.g., black background). In the FIG. 2 example, the fast pixel clock signal includes 270 (i.e., pixel 755 to pixel 1024) short pulses during the horizontal blanking period. Since the data during the blanking period is already set to a blank data value, no modification of the data block is needed.

Figure 5B:
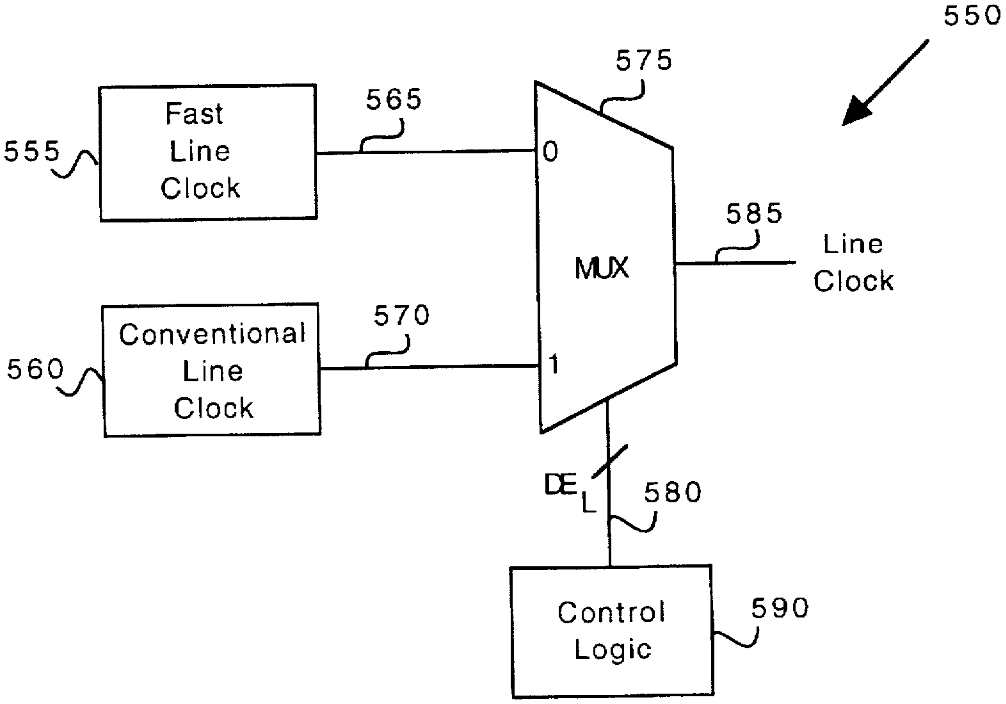
FIG. 5B is a block diagram illustrating a line clock system of a computer graphics controller in accordance with the present invention.

FIG. 5B is a block diagram illustrating a line clock system of a computer graphics controller in accordance with the present invention. Line clock system 550 includes a multiplexer (MUX) 575 which receives a fast line clock signal on line 565 from a fast line clock 555, a normal line clock signal on line 570 from a conventional line clock 560 and a control signal $DE_L$ on line 580 from control logic 590. Based on the control signal $DE_L$, MUX 575 passes either the fast line clock signal or the normal line clock signal as the line clock signal output on line 585.

Similarly to that of pixel clock system 500, during the rasterization of the image region 240 on display 235, control logic 590 instructs MUX 575 to pass the normal line clock signal from the conventional line clock 560 as the pixel clock output signal on line 585. During the vertical blanking period, control logic 590 instructs MUX 575 to pass the fast line clock signal from fast line clock 555 as the line clock signal output on line 585. The line clock signal output of line clock system 550 replaces the conventional line clock signal to horizontal shift register 205, to integral latch 215 and to vertical shift register 225.

The fast line clock signal enables the vertical shift register 225 to shift through remaining line drivers 230 corresponding to the vertical unaddressed region 255 until each display 235 line has displayed the blank data value. In the FIG. 2 example, the fast line clock signal includes 282 (i.e., corresponding to lines 487 to 768 of blank region 245) short pulses during the vertical blanking period.

Figure 6:
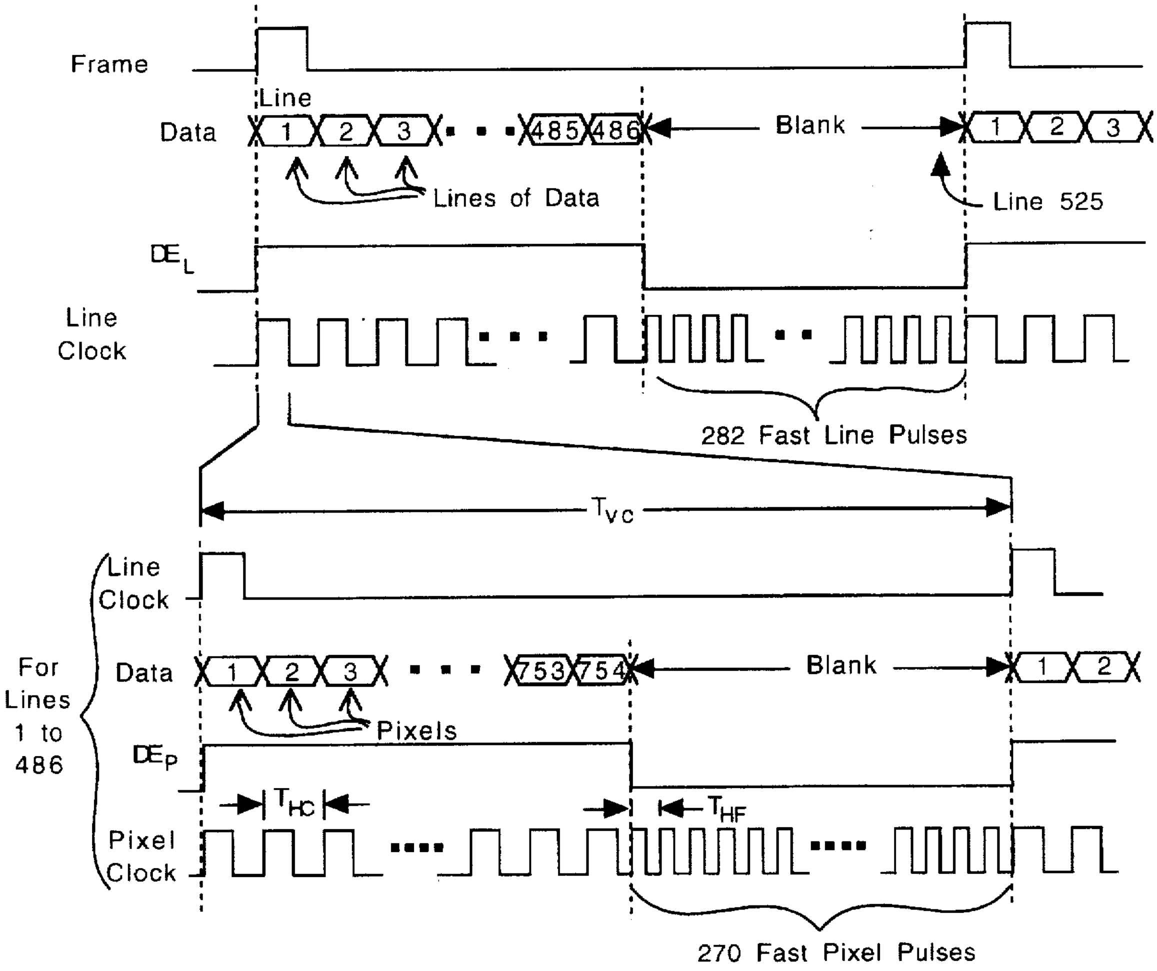
FIG. 6 is a timing diagram illustrating the use of the FIG. 5A pixel clock system and the FIG. 5B line clock system to render the first 486 lines of a 1024-pixel-by-768-line LCD image frame in NTSC TV mode.

FIG. 6 is a timing diagram illustrating the use of pixel clock system 500 (FIG. 5A) and line clock system 550 (FIG. 5B) to render the first 486 lines of a 1024-pixel-by-768-line LCD image frame in NTSC TV mode. Modified graphics controller 115 (i.e., incorporating pixel clock system 500 and line clock system 550) generates a conventional frame signal. Since TV 110 has an image height of 486 lines, the data signal illustrates a series of 486 data elements, followed by a "blank" data signal representing the 39 lines of blank region 245. Accordingly, line clock system 550 passes a line clock signal as a series of 486 conventional pulses on line 585 synchronized with the incoming 486 data elements, and since LCD 105 includes 768 scan lines then passes 282 short pulses during the vertical blanking period. The time between successive conventional line pulses is referred to as the clock period $T_{VC}$.

For the first 486 lines, since the TV 110 image is 754 pixels wide, the data signal includes a series of 754 data elements followed by a "blank" data signal representing the 156 pixel locations of blank region 247. Accordingly, improved graphics controller 115 uses pixel clock system 500 to pass a pixel clock signal output as a series of 754 conventional pulses on line 585 synchronized with the incoming 754 data elements, and since LCD includes 1024 pixels per line then passes 270 short pulses during the horizontal blanking interval. The time period of a conventional pixel clock is referred to as the period $T_{HC}$ and the time period of a fast pixel clock is referred to as the period $T_{HF}$. Accordingly, the time needed to "fast clock" the 270 pixels must be less than or equal to the TV horizontal blanking interval, or $270(T_{HF}) \leqq 156(T_{HC})$. Based on this formula, for a conventional NTSC TV pixel clock speed of approximately 28 MHz, the fast pixel clock speed must be greater than about 48 MHz.

Figure 7:
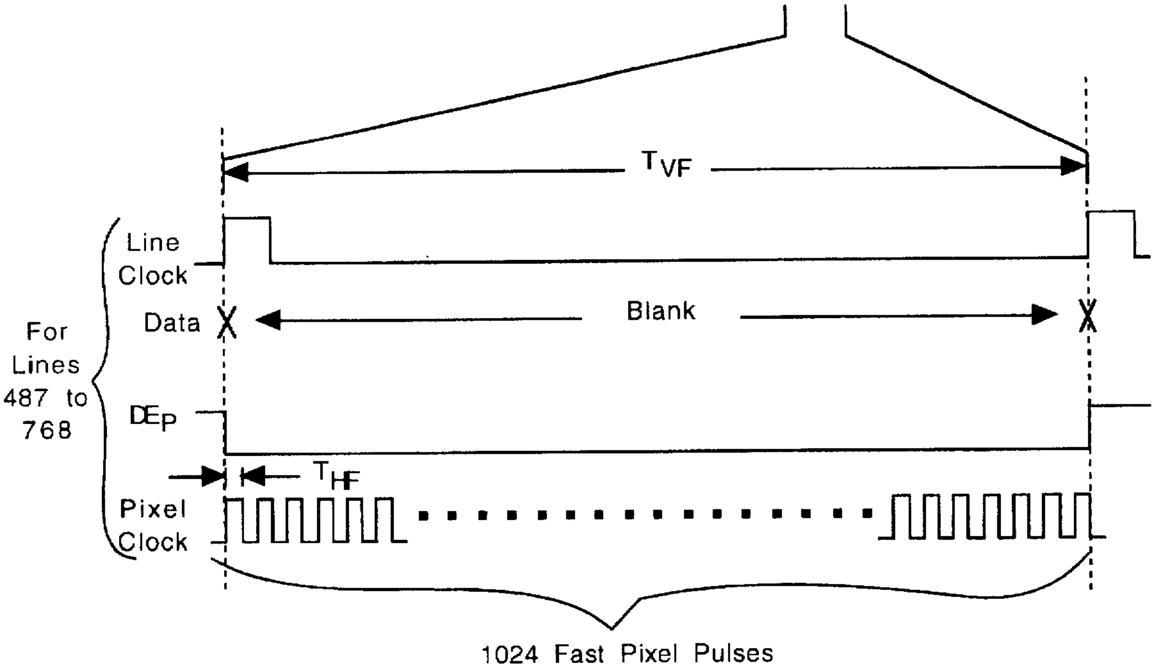
FIG. 7 is a timing diagram illustrating the use of the FIG. 5A pixel clock system and the FIG. 5B line clock system to render the last 282 lines of a 1024-pixel-by-768-line LCD image frame in NTSC TV mode.

FIG. 7 is a timing diagram illustrating the use of the FIG. 5A pixel clock system and the FIG. 5B line clock system to render the last 282 lines of a 1024-pixel-by-768-line LCD image frame in NTSC TV mode. Since the data signal is equal to the blank value for lines 487 to 525 and is nonexistent for lines 526 to 768, modified graphics controller 115 uses pixel clock system 500 and line clock system 550 to generate 1024 fast pixel clock pulses for each of the remaining 282 lines during the vertical blanking period. More particularly, for the 487the line, pixel clock system 500 uses fast pixel clock 505 to generate 1024 fast pixel pulses for capturing the blank value in each of selectable latches 210. Line clock system 550 uses fast line clock 555 to generate short line pulses for each of the remaining 282 lines. Thus, the fast line clock must have a period $T_{VF}$ greater than or equal to the time period needed to generate the 1024 fast pixel pulses, or $T_{VF} \geqq 1024(T_{HF})$. In order to blank out each of the remaining 282 lines of LCD 105, the time period needed to "fast clock" the 282 lines must be less than or equal to the TV vertical blanking period, or $282(T_{VF}) \leqq 39(T_{VC})$. If the conventional TV line clock speed is approximately 28 MHz/910 pixels, or 0.03 MHz, then the fast line clock speed must be greater than about 0.217 MHz. If the fast line clock speed is equal to 0.217 MHz, then the fast pixel clock speed must be greater than 222 MHz, which satisfies the predetermined computation that the fast pixel clock speed be greater than 48 MHz. Accordingly, a fast pixel clock speed of 222 MHz and a fast line clock speed of 0.217 MHz may be used.

Generally, for an N-pixel-by-M-line LCD 105 and an A-pixel-by B-line TV 110 with a C-pixel-by-D-line image size, the fast line clock speed and the fast pixel clock speed are computed from the equations:

$$(N-C)*\ T_{HF} \leqq (A-C)*T_{HC},$$

$$T_{VF} \geqq N*T_{HF}, \text{ and}$$

$$(M-D)*\ T_{VF} \leqq (B-D)*T_{VC}.$$

Figure 8:
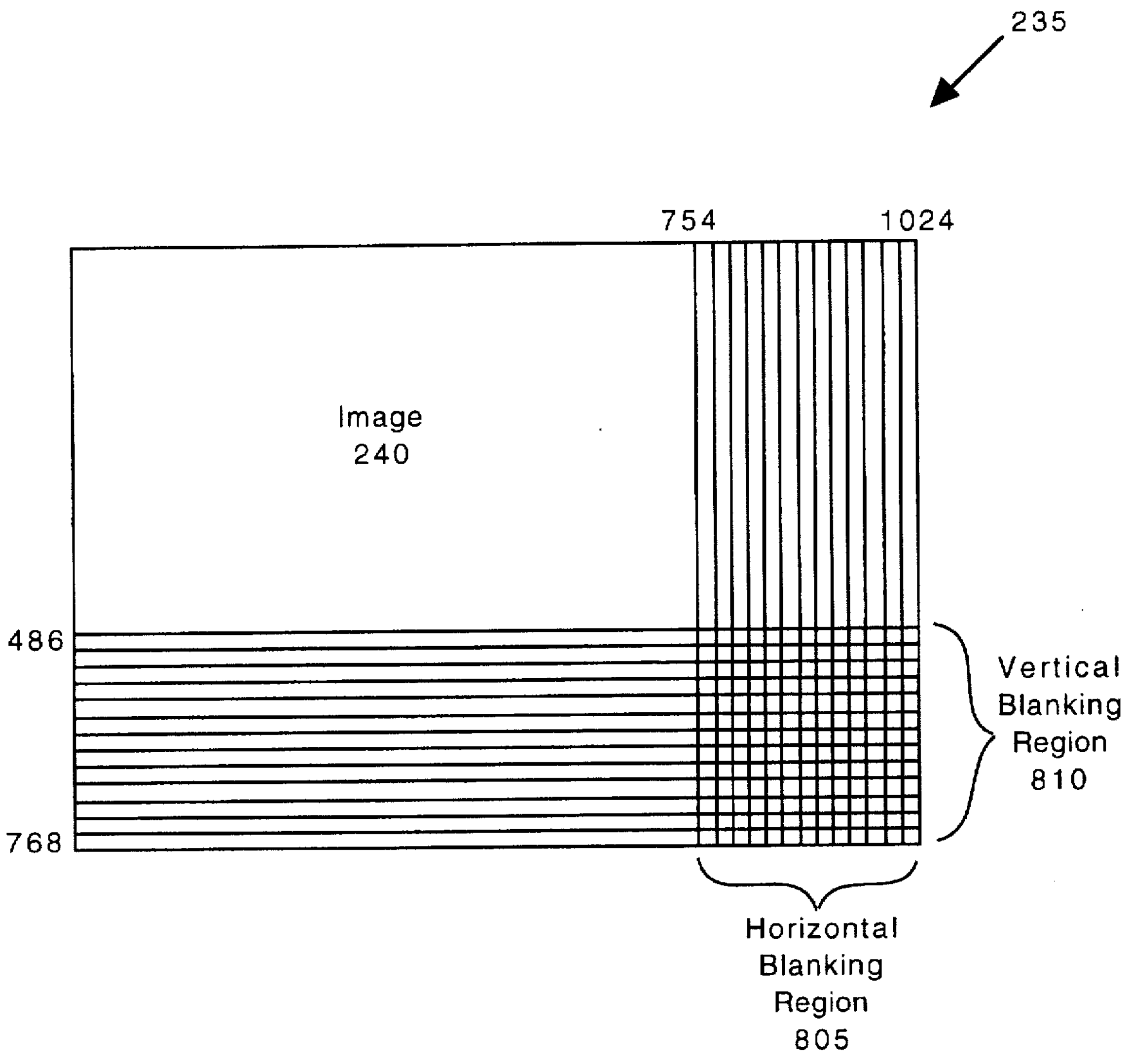
FIG. 8 is a block diagram illustrating the image on the LCD resulting from operation of the invention.

FIG. 8 is a block diagram illustrating the image resulting on the LCD 105 display 235. As compared with the FIG. 2 display 235 diagram, the 754-pixel-by-486-line image 240 is still in the top left corner of 1024-pixel-by-768-line LCD display 235. However, horizontal blanking region 805 and vertical blanking region 810 now include the previous horizontal blanking region 247, vertical blanking region 245, horizontal unaddressed region 250 and vertical unaddressed region 255, successfully eliminating image echoing.

The foregoing description of the preferred embodiments of the invention is by way of example only, and other variations of the above-described embodiments and methods are provided by the present invention. Although the invention has been described with reference to an LCD-type monitor, the invention can be practiced with any digital display that has a digital interface and digital clocked timings such as a plasma panel display or an electroluminescent panel display. Further, although the invention has been described with reference to an image space in the top left corner of an LCD display, the invention can be practiced using a display with a central image space. In such a system, the LCD display will have right and left, horizontal and vertical blanking periods and unaddressed regions, and the graphics controller will include corresponding logic circuits 540 and 590. Further, although the invention has been described with reference to handling only a single pixel per pixel clock pulse, the invention can be embodied in a system which handles multiple pixels per pixel clock pulse.

Components of this invention may be implemented using a programmed general purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The system is limited only by the following claims.

What is claimed is:

1. A display clocking system, comprising:

a line clock selector having first and second line clock input terminals for receiving first and second line clock signals, a line clock control terminal and a line clock output terminal for transmitting a selected one of the first and second line clock signals;

a first line clock coupled to the first line clock input terminal for generating the first line clock signal;

a second line clock coupled to the second line clock input terminal for generating the second line clock signal having, a higher frequency than the first line clock signal; and a line clock controller coupled to the line clock control terminal for generating a control signal to select the first line clock signal during an image rendering period and the second line clock signal during a horizontal blanking period.

2. The system of claim 1 wherein the line clock selector comprises:

a line multiplexer having a first input terminal connected to the first line clock, a second input terminal connected to the second line clock, an output terminal connected to a digital display, and a control terminal for controlling which one of the clock signals passes to the output terminal; and control logic connected to the control terminal enabling the first line clock signal to pass to the output terminal during an image rendering period and the second line clock to pass to the output terminal during a vertical blanking period.

3. The system of claim 1, wherein the second line clock speed is a function of the number of lines between a vertical dimension of the image and a digital display scan size vertical dimension.

4. A display clocking system, comprising:

a pixel clock selector having first and second pixel clock input terminals for receiving first and second pixel clock signals, a pixel clock control terminal and a pixel clock output terminal for transmitting a selected one of the first and second pixel clock signals;

a first pixel clock coupled to the first pixel clock input terminal for generating the first pixel clock signal;

a second pixel clock coupled to the second pixel clock input terminal for generating the second pixel clock signal having a higher frequency than the first pixel clock signal; and a pixel clock controller coupled to the pixel clock control terminal for generating a control signal to select the first pixel clock signal during the image rendering period and the second pixel clock signal during a vertical blanking period.

5. The system of claim 4 wherein the pixel clock selector comprises:

a pixel multiplexer having a first input terminal connected to the first pixel clock, a second input terminal connected to the fast pixel clock, an output terminal connected to a digital display, and a control terminal for controlling which one of the pixel clock signals passes to the output terminal; and control logic connected to the control terminal enabling the first pixel clock signal to pass to the output terminal during an image rendering period and the second pixel clock to pass to the output terminal during vertical blanking period.

6. The system of claim 4, wherein the second pixel clock speed is a function of the difference between a horizontal dimension of the image and a digital display scan size horizontal dimension.

7. A system for fast clocking a digital display, comprising:

a line clock selector having first and second line clock input terminals for receiving first and second line clock signals, a line clock control terminal and a line clock output terminal for transmitting a selected one of the first and second line clock signals;

a first line clock coupled to the first line clock input terminal for generating the first line clock signal;

a second line clock coupled to the second line clock input terminal for generating the second line clock signal having a higher frequency than the first line clock signal;

a line clock controller coupled to the line clock control terminal for generating a control signal to select the first line clock signal during an image rendering period and the second line clock signal during a horizontal blanking period;

a pixel clock selector having first and second pixel clock input terminals for receiving first and second pixel clock signals, a pixel clock control terminal and a pixel clock output terminal for transmitting a selected one of the first and second pixel clock signals;

a first pixel clock coupled to the first pixel clock input terminal for generating the first pixel clock signal;

a second pixel clock coupled to the second pixel clock input terminal for generating the second pixel clock signal having a higher frequency than the first pixel clock signal; and a pixel clock controller coupled to the pixel clock control terminal for generating a control signal to select the first pixel clock signal during the image rendering period and the second pixel clock signal during both the horizontal blanking period and a vertical blanking period.

8. The system of claim 7 wherein the line clock selector comprises:

a line multiplexer having a first input terminal connected to the first line clock, a second input terminal connected to the second line clock, an output terminal connected to the digital display, and a control terminal for controlling which one of said line clock signals passes to the output terminal; and control logic connected to the control terminal enabling the first line clock signal to pass to the output terminal during an image rendering period and the second line clock to pass to the output terminal during a vertical blanking period.

9. The system of claim 7 wherein the pixel clock selector comprises:

a pixel multiplexer having a first input terminal connected to the first pixel clock, a second input terminal connected to the fast pixel clock, an output terminal connected to the digital display, a control terminal for controlling which one of said pixel clock signals passes to the output terminal; and control logic connected to the control terminal enabling the first pixel clock signal to pass to the output terminal during an image rendering period and the second pixel clock to pass to the output terminal during horizontal and vertical blanking periods.

10. The system of claim 7, wherein the digital display is an N-pixel-by-M-line display;

wherein the first line clock speed and the first pixel clock speed are based on an A-pixel-by-B-line display having an image size of C pixels by D lines;

wherein the system handles only one pixel per pixel clock pulse; and wherein the speeds of the second line clock and of the second pixel clock are computed according to the equations $$(N-C) * T_{HF} \leqq (A-C) * T_{HC},$$

$$T_{VF} \geqq N * T_{HF}, \text{ and}$$

$$(M-D) * T_{VF} \leqq (B-D) * T_{VC},$$

where $T_{HF}$ is the period of a second pixel clock, $T_{HC}$ is the period of a first pixel clock, $T_{VF}$ is the period of a second line clock and $T_{VC}$ is the period of a first line clock.

11. The system of claim 7, wherein the second line clock speed is a function of the number of lines between a vertical dimension of the image and a digital display scan size vertical dimension, and the second pixel clock speed is a function of the difference between a horizontal dimension of the image and a digital display scan size horizontal dimension.

12. A system for fast clocking a digital display, comprising:

means for generating a first line clock signal;

means for generating a second line clock signal having a higher frequency than the first line clock signal;

means for selecting the first line clock to drive the digital display during an image rendering period; and means for selecting the second line clock signal to drive the display during a horizontal blanking period.

13. A system for fast clocking a digital display, comprising:

means for generating a first pixel clock signal;

means for generating a second pixel clock signal having a higher frequency than the first pixel clock signal;

means for selecting the first pixel clock to drive the digital display during an image rendering period; and means for selecting the second pixel clock signal to drive the display during a vertical blanking period.

14. A method of fast clocking a digital display, comprising the steps of:

generating a first line clock signal;

generating a second line clock signal having a higher frequency than the first line clock signal;

selecting the first line clock to drive the digital display during an image rendering period; and selecting the second line clock signal to drive the display during a horizontal blanking period.

15. The method of claim 14, wherein the second line clock speed is a function of the number of lines between a vertical dimension of the image and a digital display scan size vertical dimension.

16. A method of fast clocking a digital display, comprising the steps of:

generating a first pixel clock signal;

generating a second pixel clock signal having a higher frequency than the first pixel clock signal;

selecting the first pixel clock to drive the digital display during an image rendering period; and selecting the second pixel clock signal to drive the display during a vertical blanking period.

17. The method of claim 16, wherein the second pixel clock speed is a function of the difference between a horizontal dimension of the image and a digital display scan size horizontal dimension.

18. A method of fast clocking a digital display, comprising the steps of:

generating a first line clock signal;

generating a second line clock signal having a higher frequency than the first line clock signal;

selecting the first line clock to drive the digital display during an image rendering period;

selecting the second line clock signal to drive the display during a horizontal blanking period;

generating a first pixel clock signal;

generating a second pixel clock signal having a higher frequency than the first pixel clock signal;

selecting the first pixel clock signal to drive the digital display during an image rendering period; and selecting the second pixel clock signal to drive the display during both the horizontal blanking period and a vertical blanking period.

19. The method of claim 18, wherein the digital display is an N-pixel-by-M-line display;

wherein the first line clock speed and the first pixel clock speed are computed based on an A-pixel-by-B-line display with an image size of C pixels by D lines wherein the system handles only one pixel per pixel clock pulse; and wherein the speeds of the second line clock and of the second pixel clock are computed according to the equations $$(N-C) * T_{HF} \leqq (A-C) * T_{HC},$$

$$T_{VF} \geqq N * T_{HF}, \text{ and}$$

$$(M-D) * T_{VF} \leqq (B-D) * T_{VC},$$

where $T_{HF}$ is the period of a second pixel clock, $T_{HC}$ is the period of a first pixel clock, $T_{VF}$ is the period of a second line clock and $T_{VC}$ is the period of a first line clock.

20. The method of claim 18, wherein the second line clock speed is a function of the number of lines between a vertical dimension of the image and a digital display scan size vertical dimension, and the second pixel clock speed is a function of the difference between a horizontal dimension of the image and a digital display scan size horizontal dimension.

* * * * *